United States Patent
Ohhashi

(10) Patent No.: US 11,350,008 B2
(45) Date of Patent: May 31, 2022

(54) IMAGE RECORDING APPARATUS AND IMAGE RECORDING JOB GROUPING METHOD

(71) Applicant: BROTHER KOGYO KABUSHIKI KAISHA, Nagoya (JP)

(72) Inventor: Masashi Ohhashi, Kasugai (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 17/035,895

(22) Filed: Sep. 29, 2020

(65) Prior Publication Data

US 2021/0099601 A1    Apr. 1, 2021

(30) Foreign Application Priority Data

Sep. 30, 2019 (JP) .............. JP2019-179935

(51) Int. Cl.
*H04N 1/00* (2006.01)
*G06F 3/12* (2006.01)

(52) U.S. Cl.
CPC ....... *H04N 1/00957* (2013.01); *G06F 3/1262* (2013.01); *G06F 3/1263* (2013.01); *H04N 1/00482* (2013.01); *H04N 1/0009* (2013.01); *H04N 2201/212* (2013.01); *H04N 2201/218* (2013.01); *H04N 2201/3216* (2013.01)

(58) Field of Classification Search
None
See application file for complete search history.

(56) References Cited

U.S. PATENT DOCUMENTS

| | | | |
|---|---|---|---|
| 2010/0097649 A1* | 4/2010 | Akiyama | G06F 3/1288 358/1.15 |
| 2016/0059545 A1* | 3/2016 | Watanabe | B41J 3/46 347/5 |
| 2019/0155554 A1* | 5/2019 | Yan | G06F 3/1285 |
| 2019/0163422 A1* | 5/2019 | Matsuo | G06F 3/1211 |
| 2019/0163423 A1* | 5/2019 | Nishio | G06F 3/1262 |
| 2019/0391775 A1* | 12/2019 | Isobe | G06F 3/1232 |
| 2021/0019097 A1* | 1/2021 | Sawata | G06F 3/1262 |

FOREIGN PATENT DOCUMENTS

| | | |
|---|---|---|
| JP | 2010-167627 A | 8/2010 |
| JP | 2017-046251 A | 3/2017 |

\* cited by examiner

*Primary Examiner* — Dov Popovici
(74) *Attorney, Agent, or Firm* — Scully, Scott, Murphy & Presser, PC

(57) ABSTRACT

A controller is configured to store a received print job in a RAM or an EEPROM, determine whether to group multiple print jobs in response to receipt of input to an input I/F, obtain device status information in response to determine to grouping the multiple print jobs, generate size information and sheet information matching to the device status information as a group key, group the multiple print jobs including size information and sheet information matching the group key, and display the group, in a selectable manner, as a subject of image recording on a display.

14 Claims, 7 Drawing Sheets

IMAGE RECORDING APPARATUS AND IMAGE RECORDING JOB GROUPING METHOD

CROSS-REFERENCE TO RELATED APPLICATIONS

This application claims priority under 35 U.S.C. § 119 from Japanese Patent Application No. 2019-179935 filed on Sep. 30, 2019. The entire subject matter of the application is incorporated herein by reference.

BACKGROUND

Technical Field

The present disclosures relate to a method of grouping multiple accumulated image recording jobs as image recording jobs subjected to be executed collectively.

Related Art

Conventionally, there is known an image recording apparatus which is configured such that, when the image recording apparatus receives multiple image recording jobs, the image recording apparatus does not execute the received image recording jobs immediately but accumulate the same in a storage, and executes the accumulated image recording jobs when the image recording apparatus receives a user input to executed the same. There could be a case where, among the multiple print jobs accumulated in the image recording apparatus, types of recording media, the number of copies to be output, or conditions for post processes to be executed after image recordings are finished may be common or different. In view of image recording efficiency and/or in accordance with users' requests, it is desired to batch execution of the image recording jobs having common conditions, but not execute the image recording jobs in the accumulated order. In regard to the above technique, there has conventionally been known another process in which, when the image recording apparatus receives image recording jobs to be accumulated, the image recording apparatus groups ones matching a condition which was identified in advance.

SUMMARY

When the image recoding apparatus is used by multiple users in a shared manner, after a user causes a computer to start outputting an image recording job to the image recording apparatus and before the user operates the image recording apparatus, another user might use the image recording apparatus. That is, there could be a case where, after one user makes an PC or the like to start outputting an image recording job and before the one user operates the image recording apparatus to perform an image recordation, a status of the image recording apparatus has been changed.

For example, after a first user causes a PC to start outputting an image recording job and before the first user operates the image recording apparatus, if a second user changes a type of recording media accommodated in a tray of the image recording apparatus, there could be a case where a first type of recording media, which is to be used in grouped image recording jobs output by the first user, have not been accommodated in the tray when the image recording jobs are executed. In such a case, the first user may realize that the different type of recording medium, which does not correspond to the grouped image recording jobs, is accommodated in the tray when she/he comes in front of the image recording apparatus, needs to exchange the different type of recording media currently accommodated in the tray for appropriate recording media to be used in the grouped image recording jobs. Similarly, if another user has changed device settings after the first user causes the PC to start outputting an image recording job and before the first user operates the image recording apparatus, the first user needs to re-set the device settings after she/he comes in front of the image recording apparatus. If such a situation occurs, the image recording jobs grouped by the first user cannot be executable immediately in the image recording apparatus, and the first user may be required to perform troublesome operations for image recordation.

According to aspects of the present disclosure, there is provided an image recording apparatus including an image recording part configured to perform image recording on a recording medium, an input interface configured to receive inputting operation of a user, a display, a memory and a controller. The controller performs receiving an image recording job including an accumulation condition and image recording information and storing the image recording job in the memory, determining whether to group multiple image recording jobs stored in the memory in response to receiving inputting operation to the input interface, obtaining device status information in response to determining to group the multiple image recording jobs and generating, as a priority group condition, particular image recording information matching the device status information among the multiple pieces of image recording information included in the multiple image recording jobs stored in the memory, respectively, and displaying, in a selectable manner, the priority group condition as a condition of grouping particular multiple image recording jobs including the particular image recording information and performing the particular multiple image recording jobs.

BRIEF DESCRIPTION OF THE ACCOMPANYING DRAWINGS

Figure 6A:
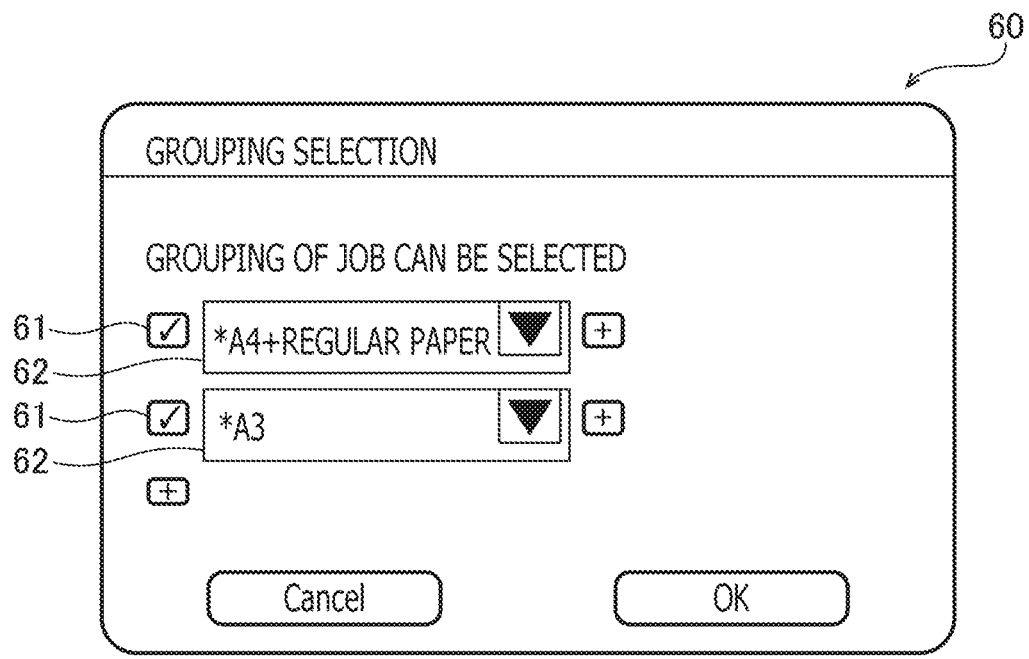
Figure 6B:
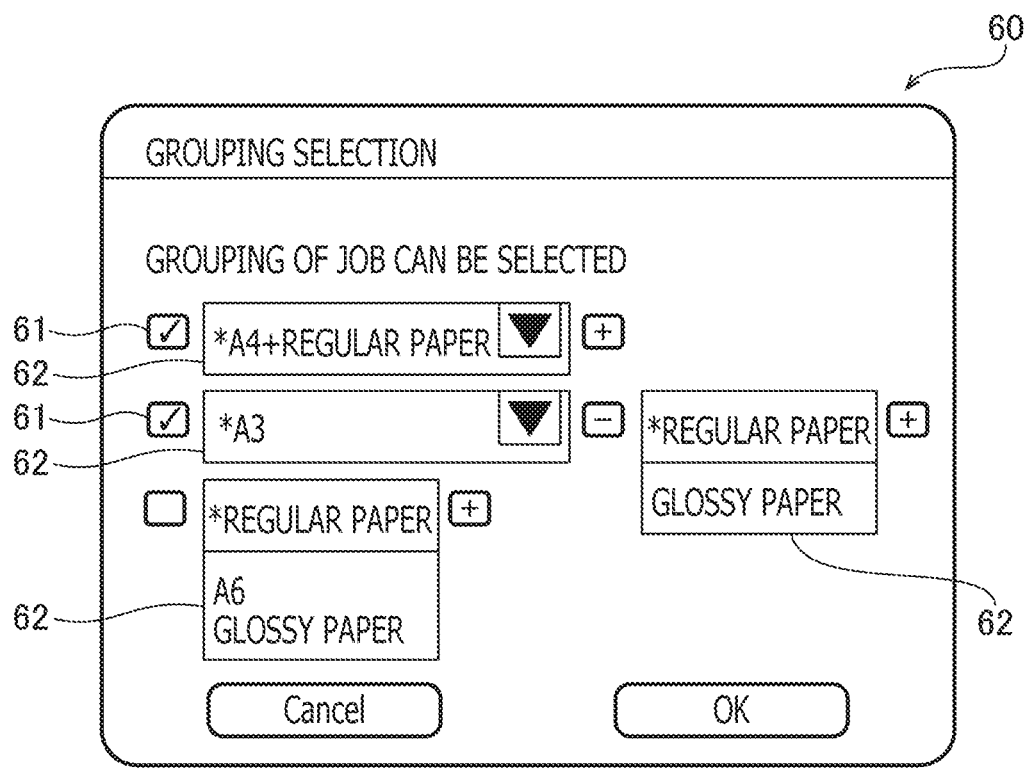

FIGS. 6A and 6B respectively show examples of group key selection screen.

Figure 7:
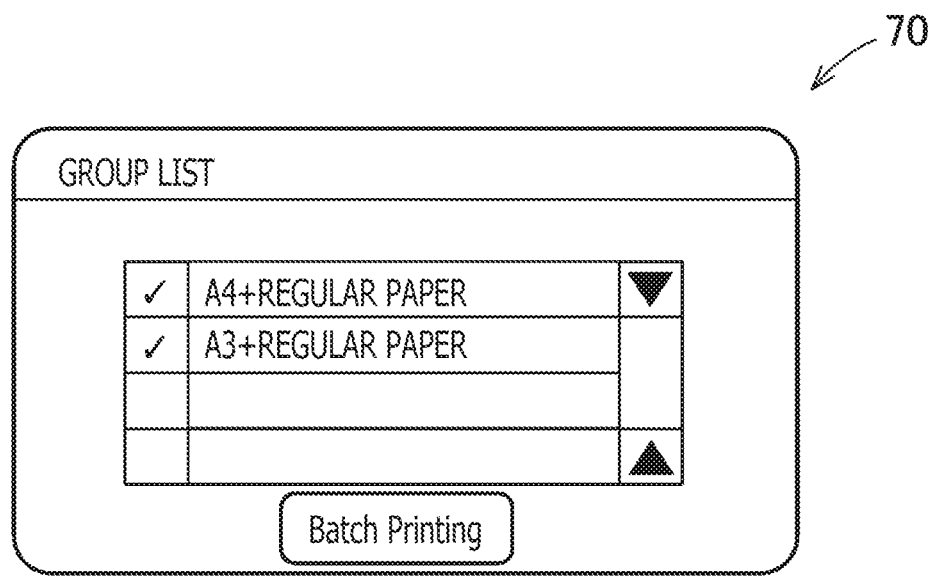

FIG. 7 shows a group list screen.

DETAILED DESCRIPTION OF THE EMBODIMENT

Hereinafter, referring to the accompanying drawings, an embodiment according to the present disclosures will be described. It is noted that the embodiment described hereinafter is only an illustrative embodiment and the embodiment can be modified in various ways without departing from the aspects of the present disclosures.

[Configuration of Printer 10]

A printer 10, which is an example of an image recording apparatus according to the present disclosures, is configured to mutually communicate with an information processing terminal 50 through a communication network. The communication network should not be limited to a particular one and may be, for example, a wired LAN, a wireless LAN or a USB cable. In the information processing terminal 50, a driver program configured to generate a print job to be transmitted to the printer 10 is installed. It is noted that, in FIG. 1, although only one information processing terminal 50 is indicated, the printer 10 may be configured to communicate with multiple information processing terminals 50.

Figure 1:
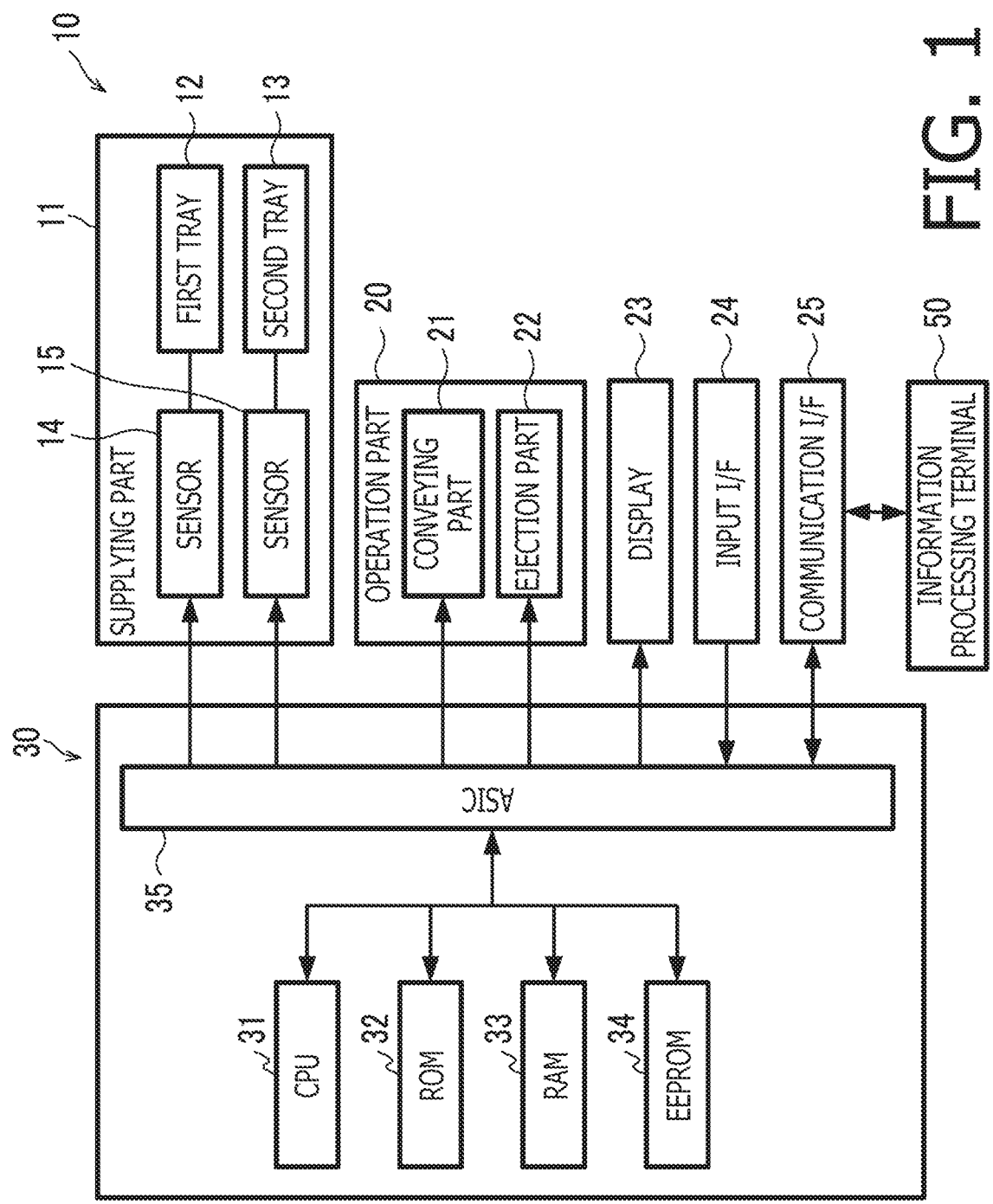
FIG. 1 is a block diagram of a printer according to an embodiment of the present disclosures.

As shown in FIG. 1, the printer 10 mainly has a supplying part 11, an operation part 20, a display 23, an input I/F 24, a communication I/F 25 and a controller 30. Such components constituting the printer 10 are mutually connected through a communication bus. In the following description, the printer 10 is described as an inkjet printer. However, a recording method of the printer 20 does not need to be limited to the inkjet method, but the printer 10 may employ any other known method such as an electrophotographic method.

The supplying part 11 is configured to accommodate recording media such as papers, and supply the recording media to the operation part 20 in accordance with an instruction from the controller 30. The supplying part 11 has a first tray 12, a second tray 13, and sensors 14 and 15. The first tray 12 and the second tray 13 accommodate recording media, respectively. The recording media accommodated in the first tray 12 and the recording media accommodated in the second tray 13 may be or may not be the same ones or different ones. According to the embodiment, it is assumed that the first tray 12 and the second tray 13 accommodate printing sheets having different sizes, respectively. For example, the first tray 12 accommodates JIS standard A4 size normal sheets, while the second tray 13 accommodates JIS standard A3 size normal sheets. Information indicating the sizes and types of the recording media accommodated in the first tray 12 and the second tray 13 are input, through the input I/F 24, by the user and stored in the EEPROM 34. The user input of the information indicating the sizes and the types of the recording media is performed when, for example, the controller 30 requests the user to input the same when the user withdraws the first tray 12 or the second tray 13 and then attaches the same. It is noted that the first tray 12 and the second tray 13 are examples of a tray.

The sensor 14 is configured to detect whether the number of the recording media accommodated in the first tray 12 is less than a particular amount. For example, the supplying unit has a rotatable lever configured to rotate as is press-contacted onto the uppermost sheet of the recording media accommodated in the first tray 12, and the sensor 14 is configured to detect the lever has reached a particular rotary position. The lever is located at a particular rotated position when the sheets accommodated in the first tray 12 becomes a particular amount (e.g., a relatively small amount). Then, the sensor 14 detects the lever located at the particular rotated position and outputs a detection signal to the controller 30. Then, the controller 30 detects that the amount of the sheets accommodated in the first tray 12 becomes the particular amount. The sensor 15 detects, similarly to the sensor 14, whether the number of the recording media accommodated in the second tray 13 is less than the particular amount. The detection signals output by the sensors 14 and 15 are examples of accommodation information. Although not shown in FIG. 1, the supplying part 11 has a supplying mechanism including rollers for supplying the recording media accommodated in the first tray 12 and the second tray 13 to the operation part 20.

The operation part 20 executes print jobs in accordance with instructions by the controller 30. The print job is an image recording job of recording images on the sheets. As shown in FIG. 1, the operation part 20 includes a conveying part 21 and an ejection part 22. It is noted that the operation part is an example of image recording part.

The conveying part 21 is configured to convey the sheet supplied from the supplying part 11 in a conveying direction. The conveying part 21 is provided with, for example, multiple rollers configured to rotate by a driving force of a motor (not shown). The multiple rollers rotated by the motor are configured to convey the sheet supplied from the supplying part 11 to a position facing the ejection part 22, and discharge the sheet on which an image is formed by the ejection part 22 outside the printer 10.

The ejection part 22 is configured to move, within an area where the ejection part 22 faces the sheet conveyed by the conveying part 21, in a main scanning direction which is perpendicular to the conveying direction. The ejection part 22 moves in the main scanning direction as a driving force of a motor (not shown) is transmitted. A lower surface of the ejection part 22 is formed to be a nozzle surface on which multiple nozzles are formed. The ejection part 22 is configured such that ink droplets are ejected from the respective nozzles. The ink droplets ejected from the nozzles reach the sheet while the ejection part 22 moves in the main scanning direction, thereby an image is formed on the sheet.

The display 23 may be a liquid crystal display, an organic EL display or the like and have a displaying surface configured to display various pieces of information. The display 23 is an example of a display.

The input I/F 24 is an input interface configured to receive inputting operations of the user. For example, the input I/F 24 is provided with buttons, and transmit operation signals corresponding to the buttons operated by the user to the CPU 31. The input I/F 24 may be further provided with a film-like touch sensor overlaid on the displaying surface of the display 23.

The communication I/F 25 is an interface configured to communicate with an external device through the communication network. The printer 10 transmits various pieces of information to the external device through the communication I/F 25, and receives various pieces of information from the external device through the communication I/F 25. The communication I/F 25 may be an interface configured to transmit/receive radio signals in accordance with a communication procedure compliant to Wi-Fi® or an interface to which a LAN cable or a USB cable is connected.

The controller 30 is configured to control an entire operation of the printer 10. As shown in FIG. 1, the controller 30 is a microcomputer mainly includes a CPU 31, a ROM 32, a RAM 33, an EEPROM 34 and ASIC 35.

The ROM 32 stores a program which, when executed by the CPU 31, controls operation of the printer 10. The RAM 33 is used as a storage or a work area for temporarily storing various pieces of data which are used by the CPU 31 when executing the program. The EEPROM 34 is configured to store settings and flags to be maintained after the printer 10 is powered off. The CPU 31 controls the operation of the printer 10 by retrieving the program from the ROM 32 and executing the same. To the ASIC 35, the conveying part 21, the ejection part 22, the display 23, the input I/F 24 and the communication I/F 25 are connected. The ASIC 35 causes, in accordance with instructions by the CPU 31, respective components of the printer 10 to operate.

The ASIC 35 is configured to output a driving signal to the motor. When the motor rotates, the supplying part 11 picks up the sheet from the first tray 12 or the second tray 13. Then, the conveying part 21 conveys the picked up sheet, while the ejection part 22 moves in the main scanning direction. The ASIC 35 transmits driving signals to driving elements such as piezo elements. As the driving elements oscillate, the ejection part 22 ejects ink droplets from the nozzles. The ASIC 35 transmits an image signal to the display 23 to cause the display 23 to display a screen. The ASIC 35 obtains an operation signal output from the input I/F 24. Further, the ASIC 35 receives information from an external device through the communication I/F 25, and transmits information to an external device through the communication I/F 25.

[Print Job Output from Information Processing Terminal 50]

The information processing terminal 50 is configured to output a print job. The print job includes condition information. The condition information is information indicating an execution condition of the print job to be executed by the printer 10. The condition information according to the present disclosures includes size information, color information, tray information, sheet information, a secure flag and discrimination information. The size information and the sheet information are examples of image recording information and medium information, respectively. The secure flag is an example of an accumulation condition.

The size information represents a size (e.g., A4, A3 or the like) of the sheet to be used for the print job. The color information indicates the number of color inks used for the print job. The color information may indicate a color condition of the print job such as "color" or "monochrome." The tray information indicates one of multiple trays (e.g., a first tray and a second tray) the printer 10 has. The sheet information indicates types of the sheets (e.g., a "regular paper" sheet, a "glossy paper" and the like) used for the print job.

The secure flag is information indicating whether or not to make the printer 10 execute a secure printing. The secure flag is set to a first value ("ON") corresponding to an instruction causing the printer 10 to execute the secure printing, or a second value ("OFF") corresponding to an instruction causing the printer 10 not to execute the secure printing. The discrimination information is a PIN designated by the user. Only when the secure flag is set to the first value (i.e., "ON"), the discrimination information is set to a valid value. It is noted that the discrimination information may be an ID the printer driver automatically assigns without requiring the user to designate. Further, the discrimination information may indicate an output source of the print job. The output source is, for example, the user instructing the image recording or the information processing terminal 50 outputting the print job to the printer 10.

The secure printing is a print job which is started after the discrimination information is input. That is, the printer 10 does not immediately start a print job in response to receipt of a print instruction instructing to execute the secure printing, but starts the print job after receiving input of the discrimination information through the input I/F 24.

The print job contains print instruction information. The print instruction information is information instructing execution of the print job and includes feed instruction information, registration instruction information, conveyance instruction information, ejection instruction information and discharge instruction information.

[Printing Process]

Hereinafter, referring to FIG. 2, a printing process executed by the printer 10 will be described. The printer 10 executes the printing process in response to receipt of the print job from the information processing terminal 50 through the communication I/F 25. Processes described below may be executed as the CPU 31 retrieves the program stored in the ROM 32 and executes the same. Alternatively, the processes described below may be executed by hardware circuits implemented in the controller 30.

The controller 30 of the printer 10 determines whether the secure flag, which is included in the print job received from the information processing terminal 50 through the communication I/F 25, is set to the first value "ON" (S11). Based on determination that the secure flag is set to the first value "ON," the controller 30 stores the print job in the RAM 33 or the EEPROM 34 (S12).

Based on determination that the secure flag is set to the second value "OFF," the controller 30 executes the printing process in accordance with the print instruction information and the image recording information contained in the print job.

In detail, the controller 30 executes the feeding process and the registration process in accordance with the received image recording information (S13). That is, the controller 30 causes the conveying part 21 to feed the sheet accommodated in the first tray 12 or the second tray 13 designated in the image recording information. Next, the controller 30 causes the conveying part 21 to convey the sheet fed in the feeding process to the registration position.

Next, the controller 30 executes an ejection process in accordance with the print job (S14). That is, the controller 30 moves the ejection part 22 from one end toward the other end in the main scanning direction, while causing the ejection part 22 to eject ink droplets at ejection timings represented by the ejection instruction information.

Next, the controller 30 determines whether an image has been recorded within an entire recording area of the sheet (S15). In response to determination that the image has not been recorded within the entire recording area of the sheet, that is, image recordation for one sheet has not been completed (S15: NO), the controller causes the conveying part 21 to convey the sheet by a particular conveying amount (S16). The controller 30 repeatedly executes processed in S14-S16 until image recordation on one sheet has been completed.

Then, in response to determination that the image recordation on the entire sheet has been completed (S15), the controller 30 executes a discharge process (S17). That is, the controller 30 causes the conveying part 21 to discharge the sheet, on which the image has been recorded, out of the printer 10. It is noted that the print job contains data for multiple pages, the processes of S13-S17 are repeated executed.

[Secure Printing Process]

When the user designates, using the information processing terminal 50, execution of the secure printing process, the user moves away from the information processing terminal 50 and goes to the printer 10, and then causes the printer 10 to execute the secure printing process with performing an input operation through the input I/F 24. As described above, the RAM 33 stores the print job of which secure flag is set to the first value "ON." When the user designates the secure printing for multiple print jobs, the multiple print jobs are stored in the RAM 33 or the EEPROM 34.

Figure 3:
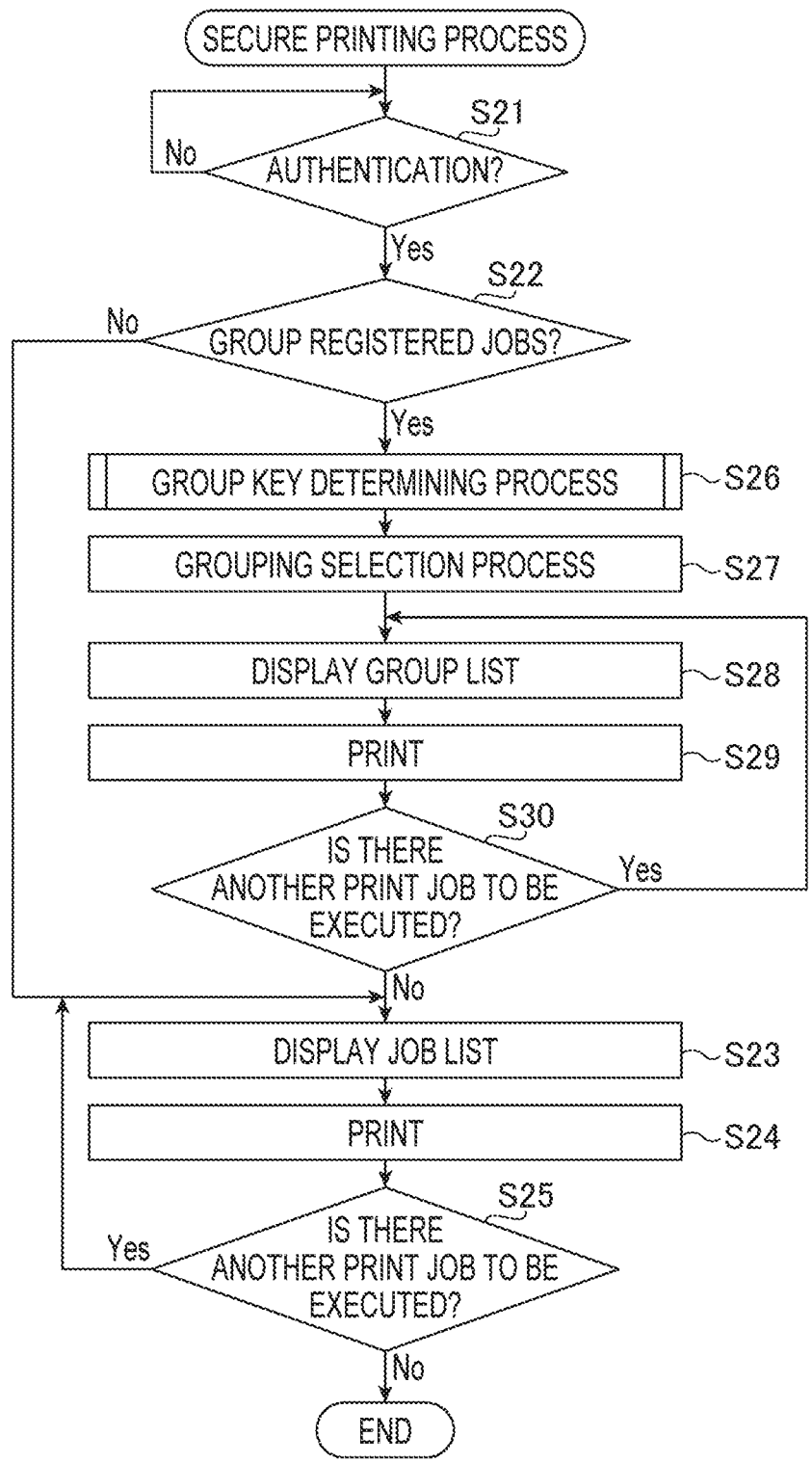
FIG. 3 is a flowchart illustrating a secure printing process.

As shown in FIG. 3, the controller 30 receives input of authentication information through the input I/F 24 (S21). based on the user inputting the designated PIN, selecting the ID assigned by the printer driver and/or further inputting the designated password, the controller 30 receives the authentication (S21: YES).

Figure 4:
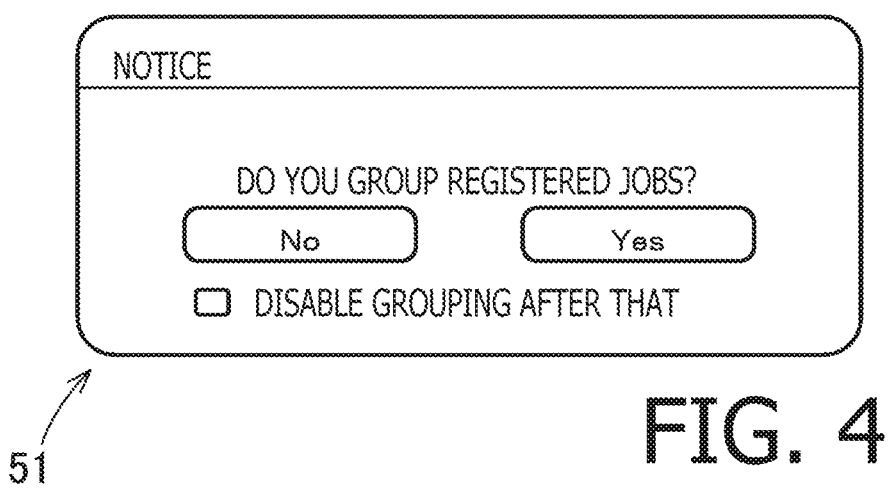
FIG. 4 shows an inquiry screen.

After receiving the authentication information, the controller 30 displays an inquiry screen 51 inquiring the user whether or not to group the registered (i.e., stored) print jobs (S22) as indicated in FIG. 4. In the inquiry screen 51, a text object "DO YOU GROUP REGISTERED JOBS?" which inquires the user whether or not to group the stored print jobs, an indication "YES" to be selected when the user wants to group the print jobs, and an indication "NO" to be selected when the user does not want to group the print jobs. Viewing the display 23, the user recognizes that input to indicate whether or not the user wants to group the print jobs should be performed, and inputs whether or not the print jobs should be grouped through the input I/F 24 (i.e., selects the indication "YES" or "NO" on the inquiry screen 51 in the present embodiments).

In response to the indication "NO" of the inquiry screen 51 being input through the input I/F 24 (S22: NO), the controller 30 deletes the inquiry screen 51 from the display 23 and displays a list of the registered print jobs, that is, the print jobs stored in the RAM 33 and/or the EEPROM 34, on the display 23 as a job list showing selectable print jobs, without grouping the registered print jobs (S23).

The user selects, from among the print jobs in the job list, a print job subjected to be the printing process through the input I/F 24, thereby executing the printing process of the desired print job (S24). The printing process is similar to a process of S13-S17 in FIG. 2. Then, the controller 30 deletes the print job of which the printing process has been completed from the job list. Thereafter, if the user wishes to execute another print job listed on the job list (S25: YES), the user selects another print job from the job list and executes the printing process, subsequently, as described above. When S23-S25 are repeated and there become no print jobs stored in the RAM 33 or the EEPROM 34 (S25: NO), the controller 30 terminates the secure printing process.

In response to the indication "YES" of the inquiry screen 51 being input through the input I/F 24 (S22: YES), the controller 30 determines that multiple print jobs are to be grouped and performs a group key determining process (S26). It is noted that grouping is to determine a group of multiple print jobs in order to assort the multiple print job stored in the RAM 33 based on printing conditions and display the multiple print jobs in a listed manner, or in order to execute multiple printing processes respectively corresponding to the multiple print jobs successively by only one start instruction for a printing process without receiving multiple start instructions to start the printing processes of respective multiple print jobs.

Figure 5:
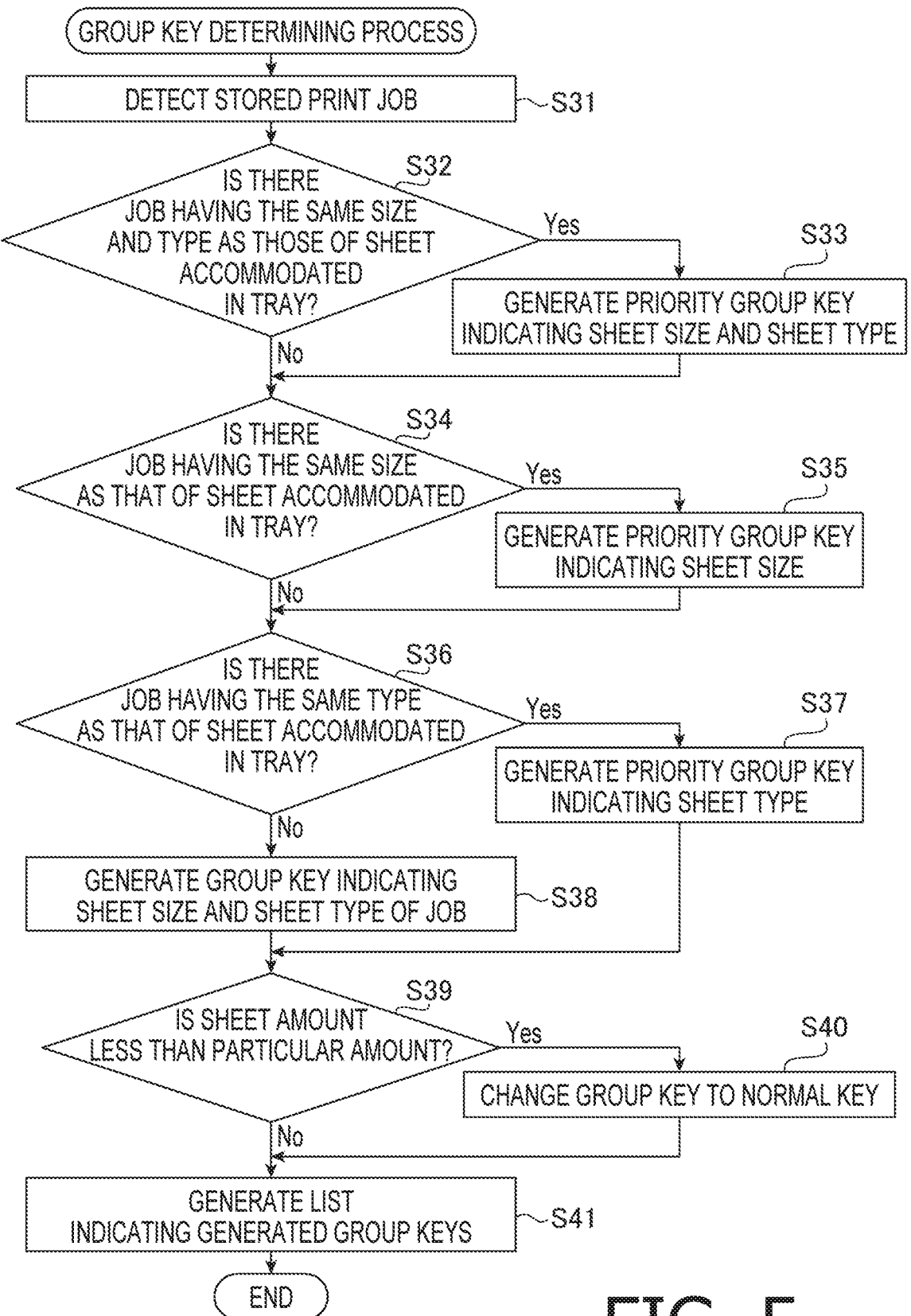
FIG. 5 is a flowchart illustrating a group key determining process.

FIG. 5 shows a flowchart of a group key determining process which is called in S26 of the flowchart shown in FIG. 3. The controller 30 searches, from among the multiple print jobs stored in the RAM 33, a print job having the discrimination information coinciding with the authentication information received in S21 (S31). It is noted that the authentication information received in S21 indicates the same discrimination information contained in the print jobs corresponding to a particular user and output by the information processing terminal 50. The searched multiple print jobs are subjected to be grouped.

The controller 30 detects, from among the detected multiple print jobs, ones having the size information indicating the size and type of the sheets accommodated in the first tray 12 or the second tray 13 of the printer 10 (S32). Specifically, the controller 30 retrieves information (which is an example of device status information) indicating the sizes and types (sheet type) of the sheets respectively accommodated in the first tray 12 and the second tray 13 stored in the EEPROM 34. Further, the controller 30 obtains the output signals of the sensors 14 and 15. According to the present embodiment, A4 size regular paper are accommodated in the first tray 12, and A3 size normal type sheets are accommodated in the second tray 13.

In response to the controller 30 determining that, in the detected print jobs, there exist multiple print jobs having both the size information indicating the A4 size and the sheet information indicating the regular paper, or both the size information indicating the A3 size and the sheet information indicating the regular paper (S32: YES), the controller 30 stores the one or both of information (e.g., the condition information) indicating the A4 size regular paper and information indicating the A3 size regular paper in the RAM 33 as priority group keys (S33). The priority group key is an example of a priority group condition. According to the present embodiment, for the same of description, it is assumed that there exist multiple print jobs having information indicating the A4 size and the regular paper. Therefore, the controller 30 stores the information indicating the A4 size and the regular paper in the RAM 33 as the priority group key.

In response to the controller 30 determining that, in the searched print jobs, there exists no print job having the information indicating the A4 size and the regular paper or the information indicating the A3 size and the regular paper (S32: NO), the controller 30 searches the print jobs having the size information indicating the sheet sizes same as the sizes of the sheets accommodated in the first tray 12 or the second tray 13 of the printer 10, respectively (S34).

In response to the controller 30 determining that, in the detected print jobs, there exist print jobs having the size information indicating the A4 size or the A3 size (S34: YES), the controller 30 stores one or both of the size information indicating the A4 size and the size information indicating the A3 size as the priority group key(s) in the RAM 33 (S35). In the present embodiment, it is assumed that, for the sake of description, in response to the controller 30 determining that, in the detected print jobs, there exist print jobs having the size information indicating the A4 size (S34: YES), the controller 30 stores the size information indicating the A4 size as the priority group key in the RAM 33 (S35).

In response to the controller 30 determining that, in the detected print jobs, there exists no print job having the size information indicating the A4 size or the A3 size (S32: NO), or after the controller 30 stores the size information indicating one or both of the A4 size and A3 size as the priority group key(s) in the RAM 33 (S35), the controller searches print jobs having the sheet information indicating the type of the sheet (the regular paper in the present embodiment) accommodated in the first tray 12 or the second tray 13, respectively (S36).

In response to the controller 30 determines that there exist, among the detected print jobs, multiple print jobs having the sheet information indicating the regular paper (S36: YES), the controller 30 stores information indicating the regular paper as the priority group key in the RAM 33 (S37).

In response to the controller 30 determines that there exists, among the detected print jobs, no print job having the sheet information indicating the regular paper (S36: NO), the controller 30 stores information indicating the common size or information indicating the common type of a sheet among the searched multiple print jobs as a normal group key (normal group condition) in the RAM 33 (S38).

Next, based on the output signals obtained from the sensors 14 and 15, the controller 30 determines whether or not the amounts of the sheets respectively accommodated in the first tray 12 and the second tray 13 are less than a particular amount (S39). It is noted that there is no particular limit to the "particular amount" but the particular amount is an amount, which has been determined, in advance and ranges for a few sheets to some tens sheets.

In response to the controller 30 determining that the amount of the sheets accommodated in the first tray 12 or the second tray 13 is less than the particular amount (S39: YES), the controller 30 changes the group key matching the size of the sheets accommodated in the first tray 12 or the second tray 13 from the priority group key to the normal group key and stores the same in the RAM 33 (S40). According to the present embodiment, the amounts of the sheets respectively accommodated in the first tray 12 and the second tray 13 are not less than the particular amount. However, if the amount of the A4 size sheets accommodated in the first tray 12 is less than the particular amount, the controller 30 changes the information indicating "A4 size" from the priority group key to the normal group key. Then, the controller 30 generates a key list indicating the priority group key and the normal group key stored in the RAM 33 and the number of the print jobs including the respective group keys and stores the key list in the RAM 33 (S41). Then, the controller 30 deletes the inquiry screen 51 from the display 23 and terminates the group key determining process (S26).

As shown in FIG. 3, after terminating the group key determining process (S26), the controller 30 performs a grouping selection process (S27). As shown in FIGS. 6A and 6B, the controller 40 displays a grouping selection screen 60 on the display 23. On the grouping selection screen 60, a text "GROUPING OF JOB CAN BE SELECTED" indicating that the user can group jobs by selecting the group key displayed on the screen, check boxes 61 allowing the user to select grouping based on arbitrarily selected one or more group keys, a pulldown menu 62 indicating the selected group key, an OK button to establish the selection, and a Cancel button to return to the inquiry screen 51.

The pulldown menu 62 is configured such that an uppermost one of the group keys is normally displayed. When the user selects a black upside-down triangle indicated on the right side of the displayed group key, a list of the multiple group keys extending in the up-down direction is displayed so that the user can select any one of the group keys in the list. When the user selects one of the group keys in the list, the list is closed and the selected one of the group keys is displayed.

According to the present embodiment, multiple pulldown menus 62 are displayed on the grouping selection screen 60. In an example shown in FIG. 6A, on a right side of a first check box 61 on a first line and on a right side of a second check box 61 on a second line, two pulldown menus 62 are displayed, respectively. Further, on a right side of each pulldown menu 62, a symbol "+" to add another pulldown menu 62 used for adding a further group key is displayed.

FIG. 6B show a state in which, in addition to two pulldown menus 62 shown in FIG. 6A, another pulldown menu 62 has been added on the right side of the second pulldown menu 60 on the second line. Thus, in FIG. 6B, the two pulldown menus 62 are aligned side by side on the second line.

It is noted that the multiple pulldown menus 62 each displayed in one line (e.g., the two pulldown menus 6 on the second line) indicate that grouping is to be done using respective group keys each of which is shown in the uppermost line in each pulldown menus 62 aligned in the right-to-left direction. In the example shown in FIG. 6B, if the first check box 61 on the first line is checked, jobs including the information indicating A4 size and the information indicating the regular paper are grouped. Regarding the multiple pulldown menus displayed, side by side, on the same line (e.g., the pulldown menus in the second line of FIG. 6B), the grouping is to be executed based on the group keys shown in the uppermost lines of respective pulldown menus. In the example shown in FIG. 6B, if the second check box 61 on the second line is checked, jobs including the information indicating A3 size shown in the left pulldown menu 62 and the information indicating the regular paper shown in the right pulldown menu are grouped. In the example shown in FIG. 6A or 6B, on the grouping selection screen 60, the two pulldown menus 62 indicated in the two lines, respectively, are selected by the checkboxes 61, two groupings are performed.

As shown in FIG. 6B, on the right side of one of the pulldown menus 62, a symbol "−" for deleting the pulldown menu 62 is displayed. Further, as shown in FIG. 6A, below the checkbox 61 in the lowermost line, a symbol "+" for adding a new line of pulldown menu 62 is indicated.

The controller 30 determines contents to be displayed in each pulldown menu 62 based on the key list generated in the group key determining process in S26. For example, it is assumed that, in the key list, four conditions "A4 size+regular paper," "A4 size," "A3 size" and "regular paper" are indicated as priority group conditions (i.e., as the priority group keys). It is further assumed that the number of print jobs matching the condition "A4 size" is larger than the number of print jobs matching the condition "A3 size." Further, in the key list, conditions "A6 size" and "glossy sheet" are indicated as normal group conditions (i.e., as the normal group keys).

The controller determines that to display each of the conditions "A4 size+normal type," "A4 size" and "A3 size" which are priority group conditions regarding the sheet size, on an uppermost in corresponding pulldown menu 62. Then, the controller determines that to display group keys indicating the other priority group conditions and the normal group condition as the group keys to be displayed on a lower side of the pulldown menus 62 corresponding to respective priority group conditions regarding the sheet size. For example, the controller 30 determines that the group key to be displayed in the uppermost of the pulldown menu 62 located on the leftmost part of the first line is "A4 size+regular paper." The controller 40 further determines that the group key indicated as a lower priority key than the "A4 size+regular paper" is the "A4 size" since the number of print jobs corresponding to this key is relatively large (e.g., larger than the that of print jobs corresponding to the "A3 size") and the group key indicated as a further lower priority key is the "A3 size" since the number of print jobs is smaller. Then the controller determines that the group key indicated a still further lower priority key is the "regular paper" which is a priority group condition regarding the type of the sheet. It is noted that the priority group condition is indicated with an asterisk "*" displayed on an upper-left portion of the group key.

Further, the controller 30 determines the conditions "A6 size" and "Glossy paper" which are the normal group conditions as the group keys to be indicated on a lower side of the priority group keys, thereby completing generation of the pulldown menu 62.

As shown in FIG. 6A, on the uppermost line of the pulldown menu 62 on the first line of the grouping selection screen 60, the top-priority group key (i.e., "A4 size+regular paper") is displayed. From the pulldown menu 62 for the second line of the grouping selection screen 60, the group key "A4 size+regular paper" which is indicated on the first line has been deleted so as not to be selectable. From the pulldown menu 62 on the second line of the grouping selection screen 60, the group key "A4 size" which is covered by the group key "A4 size+regular paper" has also been deleted so as not to be selectable. As a result, in the pulldown menu on the second line of the grouping selection screen 60, the group key "A3 size" is indicated as the group key indicated on the uppermost line of the pulldown menu 62 on the second line in the grouping selection screen 60.

As shown in FIG. 6B, in the second pulldown menu 62 which has been added on the second line (i.e., in the right side pulldown menu 62 on the second line), only the "regular paper" and the "glossy paper" are selectable since the "A3 size" has already been selected in the first pulldown menu 62 on the second line (i.e., in the left side pulldown menu 62 on the second line). If another pulldown menu is added in the third line, the "A4 size+regular paper," "A4 size" and "A3 size" corresponding to the selected group keys of the pulldown menus in the first and second lines are deleted so as not to be selectable in the pulldown menu on the third line while the "regular paper," "A6 size" and "Glossy paper" are displayed so as to be selectable.

When the user inputs "OK" through the input I/F 24 (i.e., operates the "OK" button the grouping selection screen 60), the controller 30 performs grouping of the multiple print jobs stored in the RAM 33 or the EEPROM 34 in accordance with the group keys displayed in the pulldown menu 62 of each lines, of which the checkboxes 51 are checked. Regarding the grouped print jobs, relationships with the group keys used for grouping are store in the RAM 33.

As shown in FIG. 3, the controller 30 displays, on the display 23, a group list screen 70 (S28) instead of the grouping selection screen 60 when the "OK" is clicked on the grouping selection screen 60. As shown in FIG. 7, on the group list screen 70, the group keys of the grouped multiple print jobs and multiple inputtable checkboxes on the left side thereof are displayed on the same lines, respectively. In the present embodiment, since the two groupings (i.e., "A4 size and regular paper" and "A3 size+regular paper") have been performed, the group keys "A4 size+regular paper" and "A3 size+regular paper" are displayed on two different lines. Further, in the lowermost line on the group list screen 70, a "Batch Printing" for collectively printing all the selected groups which are selected by checks is displayed.

The user can select the group subjected to the printing process by inputting a check in the group list screen 70. In the example shown in FIG. 7, the two groups "A4 size and regular paper" and "A3 size+regular paper" are selected.

In response to input, through the input I/F 24, of the "BATCH PRINTING" on the group list screen 70, the controller 30 executes the printing processes of the multiple print jobs selected on the group list screen 70 in a batch (S29). Although not shown, when the user selects, on the group list screen 70, "A4 size+regular paper" or "A3 size+ regular paper" by double click or the like, the list of the print jobs corresponding to the selected group may be displayed. In such a case, when the user selects one of the print jobs displayed in the list, the printing process of the selected print job may be executed.

Figure 2:
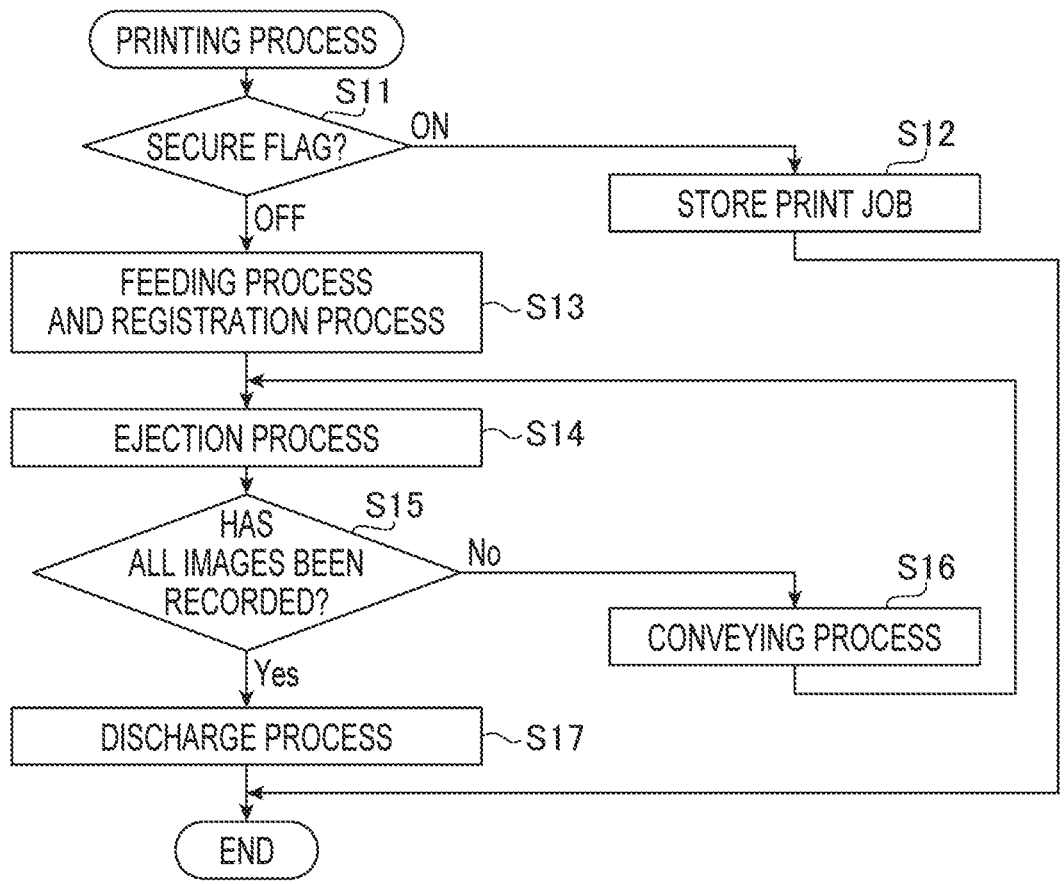
FIG. 2 is a flowchart illustrating a printing process.

The printing process in a batch (i.e. the batch printing) is similar to S13-S17 shown in FIG. 2 except that the print start instruction for each of the selected print jobs are not necessary.

There could be a case where the sheet size and the type of a generated group of print jobs match with sheets accommodated in only one of the first tray 12 and the second tray 13, and the batch printing of the group is instructed. For example, there could be a case where the "regular paper" group is made and a print job to perform printing on the A4 size regular papers and a print job to perform printing on the A6 size regular papers belong to the "regular paper" group. In such a case, when the batch printing is performed, the printing process of all the selected print jobs belonging to the group may be performed successively without receiving the print start instructions for respective print jobs. Alternatively, regarding the print jobs using the sheets which do not match the sheets accommodated in the first tray 12 or the second tray 13, the controller 30 may ask the user to exchange the accommodated sheets before the printing process is started. For example, regarding a print job using the A6 size sheets, the controller 30 may perform the printing process, without asking the user, using the A4 size regular papers or A3 size regular papers accommodated in the first tray 12 or the second tray 13, respectively, or the controller may ask the user to exchange the sheets accommodated in the first tray 12 of the second try 13 with the A6 size regular papers.

The controller 30 deletes, from the group list, the group of which printing process has been completed. According to the present embodiment, two groups are selected as shown in FIG. 7 and there is no remaining group after completion of the printing processes corresponding to two groups. However, if there exists a remaining group (S30: YES), the group list 70 is displayed on the display 23 as described above. At this stage, the groups for which the printing processes have been completed are deleted from the group list. Then, in response to a group being selected on the group list screen 70, the controller 30 subsequently performs the printing processes of the selected groups in the list by repeating S28-S30. When there becomes no group for which the printing process has not been performed (S30: No), the controller 30 displays the print jobs which are not grouped on the display as a selectable job list (S23).

The user may select print jobs subjected to the printing process from among the print jobs which are not grouped from the job list. Then, the controller 30 subsequently performs the printing processes for the selected print jobs. As the controller 30 repeats the process of S23-S25 and there become no print jobs stored in the RAM 33 or the EEPROM 34 (S25: NO), the controller 30 terminates the secure printing process.

[Effects of the Embodiment]

According to the above-described embodiment, grouping of the print jobs matching the status of the printer 10 when instruction to group the multiple print jobs is input in the inquiry screen 51 is performed. That is, grouping of the print jobs having the size information and the sheet information that match the size and type of the sheets accommodated in the first tray 12 or the second tray 13.

According to the present embodiment, the user can select, on the inquiry screen 51, whether grouping of multiple print jobs is to be performed.

Further, on the grouping selection screen 60, the user can select which one of the group keys respectively corresponding to the multiple priority group conditions is to be used to group the print jobs.

In the pulldown menu 62, the group keys corresponding to the print jobs the numbers of which are larger are indicated in an upper portion, the user can easily select the group keys the numbers of which are larger.

When the mount of the sheets accommodated in the first tray 12 or the second tray 13 is less than the particular amount, since the group key including the condition information indicating the sheets of which amount is less than the particular amount is deleted from the priority group keys (e.g., the group key is changed from the priority group key to the normal group key), it is suppressed that the user selects, as the print jobs subjected to the grouping, the print jobs which cannot be immediately performed or the print jobs which may run out of the sheets during image recordation.

According to the embodiment, when there are multiple print jobs having the size information and the sheet information which do not match the sheets accommodated in the first tray 12 or the second tray 13, the size or the type represented by the size information or the sheet information is set to the group key (i.e., the normal group key). Therefore, the user can select, as print jobs to be grouped, the print jobs having common image recordation information other that the priority group condition.

Further, since the controller 30 is configured to set the print jobs having the discrimination information matching the received authentication information to print jobs subjected to the grouping, the controller 30 can perform grouping for each user. Further, it can be suppressed that, when the user operates the printer 10, the print jobs for other users are displayed on the display 23.

MODIFICATIONS

In the embodiment described above, the sheet size and sheet type of the sheets accommodated in each of the first tray 12 and the second tray 13 are priority group condition. Instead of such conditions, information regarding consumable items which are consumed as images are recorded (e.g., the ink or the toner) may be used as the priority group condition. For example, as the device condition, there is sufficient black ink but insufficient color ink (e.g., the color ink is empty) in the printer 10, while the print jobs are set to perform a monochromatic printing using only black ink, the controller 30 may determine that the device condition and the image recording information coincide with each other and generates, as the priority group condition, the "monochromatic printing."

Further, in the above-described embodiment, in response to input of "YES" through the input I/F 24 on the inquiry screen 51, the information stored in the EEPROM 34 and indicating the size and the type of the sheets respectively accommodated in the first tray 12 and the second tray 13 (i.e., device status information) is retrieved. However, the timing at which the controller 30 retrieves the device status information may be another timing when the user performs input on the printer 10 after the information processing terminal 50 outputs the print jobs. For example, the controller 30 may obtain the device status information after receiving input of the authentication information.

The configuration of the present disclosures may not only be realized as the printer 10 but also be realized as a program causing a printer to perform the above-described processes. Such a program may be stored in a non-transitory computer-readable storing medium. The non-transitory recording medium may include not only a CD-ROM, a DVD-ROM and the like but also a storage device implemented to a server which is connectable to the printer 10 through a communication network. In such a configuration, the program store in the storage device of the server may be deliver through the communication network such as the Internet as information or signal representing the program.

What is claimed is:

1. An image recording apparatus which is configured to perform recording on a recording medium, comprising:
   an input interface configured to receive inputting operation of a user;
   a display;
   a memory; and
   a controller,
   wherein the controller performs:
      receiving an image recording job including an accumulation condition and image recording information and storing the image recording job in the memory;
      determining whether to group multiple image recording jobs stored in the memory in response to receiving inputting operation to the input interface;
      obtaining device status information in response to determining to group the multiple image recording jobs and generating, as a priority group condition, particular image recording information matching the device status information among multiple pieces of image recording information included in the multiple image recording jobs stored in the memory, respectively; and
      displaying, in a selectable manner, the priority group condition as a condition of grouping particular multiple image recording jobs including the particular image recording information and performing the particular multiple image recording jobs.

2. The image recording apparatus according to claim 1, wherein the controller performs grouping the particular multiple image recording jobs including the particular image recording information matching the priority group condition in response to receipt of a selecting operation of selecting the priority group condition through the input interface.

3. The image recording apparatus according to claim 2, wherein the controller performs:
   when there exist multiple pieces of particular image recording information matching the device status information, generating multiple priority group conditions corresponding to the multiple pieces of particular image recording information; and
   displaying the multiple priority group conditions on the display.

4. The image recording apparatus according to claim 3, wherein the controller performs displaying the multiple priority group conditions on the display in order of a large number of image recording jobs corresponding to the multiple priority group conditions, respectively.

5. The image recording apparatus according to claim 1, wherein the device status information is information regarding consumable items which are consumed as images are recorded.

6. The image recording apparatus according to claim 1 further comprising a tray configured to accommodate a recording medium,
   wherein the controller performs:
      obtaining medium information indicating a type of the recording medium accommodated in the tray as the device status information; and
      generating, as the priority group condition, particular medium information matching the obtained medium information among multiple pieces of medium information which are included in the multiple image recording jobs stored in the memory as the multiple pieces of image recording information, respectively.

7. The image recording apparatus according to claim 1 further comprising a plurality of trays,
wherein the controller performs:
obtaining multiple pieces of medium information indicating types of recording media accommodated in the plurality of trays; and
generating, as the priority group condition, particular medium information matching any one of the multiple pieces of medium information among multiple pieces of medium information which are included in the multiple image recording jobs stored in the memory as the multiple pieces of image recording information, respectively.

8. The image recording apparatus according to claim 7, wherein the controller performs:
obtaining accommodation information indicating an amount of the recording media accommodated in each of the plurality of trays in response to receipt of a grouping operation of instructing grouping multiple image recording jobs through the input interface; and
deleting particular medium information corresponding to each tray of the plurality of trays of which the accommodation information indicates an amount less than a particular amount from the particular medium information which is to be generated as the priority group condition.

9. The image recording apparatus according to claim 6, wherein the medium information indicates a size of the recording medium.

10. The image recording apparatus according to claim 6, wherein the medium information indicates a type of the recording medium.

11. The image recording apparatus according to claim 1, wherein the controller performs:
generating, as a normal group condition, image recording information which does not match the device status information among the multiple pieces of image recording information;
displaying the normal group condition; and
grouping multiple normal image recording jobs including the particular image recording information matching the normal group condition in response to receipt of a selecting operation of selecting the normal group condition through the input interface.

12. The image recording apparatus according to claim 1, wherein the image recording job includes discrimination information indicating an output source of the image recording job, and
wherein the controller performs grouping the multiple image recording jobs including the discrimination information indicating a same output source as an output source input through the input interface.

13. The image recording apparatus according to claim 12, wherein the controller performs:
displaying an inquiry screen of inquiring of the user whether to group the multiple image recording jobs in response to determining that the user inputs the discrimination information through the input interface; and
determining to group the multiple image recording jobs in response to receipt of a grouping operation of instructing grouping the multiple image recording jobs through the input interface.

14. A grouping method of image recording jobs including:
receiving an image recording job including an accumulation condition and image recording information and storing the image recording job in a memory;
determining whether to group multiple image recording jobs stored in the memory in response to receiving inputting operation to an input interface;
obtaining device status information in response to determining to group the multiple image recording jobs and generating, as a priority group condition, particular image recording information matching the device status information among multiple pieces of image recording information included in the multiple image recording jobs stored in the memory, respectively; and
displaying, in a selectable manner, the priority group condition as a condition of grouping particular multiple image recording jobs including the particular image recording information and performing the particular multiple image recording jobs.

* * * * *